United States Patent [19]

Kronenberg

[11] 4,048,403
[45] Sept. 13, 1977

[54] NON-AQUEOUS LEAD DIOXIDE CELL HAVING A UNIPOTENTIAL DISCHARGE VOLTAGE

[75] Inventor: Marvin Lee Kronenberg, Cleveland Heights, Ohio

[73] Assignee: Union Carbide Corporation, New York, N.Y.

[21] Appl. No.: 754,532

[22] Filed: Dec. 27, 1976

[51] Int. Cl.$^2$ .............................................. H01M 6/14
[52] U.S. Cl. ..................................... 429/194; 429/228
[58] Field of Search .............................. 429/194–197, 429/228, 218

[56] References Cited

U.S. PATENT DOCUMENTS

| 3,877,983 | 4/1975 | Hoosepian | 429/194 |
| 3,907,597 | 9/1975 | Mellors | 429/228 X |

*Primary Examiner*—C. F. LeFevour
*Attorney, Agent, or Firm*—Cornelius F. O'Brien

[57] ABSTRACT

A non-aqueous lead oxide cell having a negative electrode, such as lithium, a non-aqueous electrolyte, a positive electrode comprising lead dioxide housed in a positive terminal conductive container, and wherein a layer of lead and/or lead monoxide is interposed substantially between the positive lead dioxide electrode and the inner surface of the positive terminal conductive container so as to achieve a substantially unipotential discharge for the cell over its useful life.

24 Claims, 6 Drawing Figures

NON-AQUEOUS LEAD DIOXIDE CELL HAVING A UNIPOTENTIAL DISCHARGE VOLTAGE

FIELD OF THE INVENTION

The invention relates to non-aqueous lead oxide cells, and specifically to such cells wherein the positive electrode comprises lead dioxide housed in a conductive container and wherein a layer of lead and/or lead monoxide is interposed substantially between the lead dioxide electrode and the inner surface of the conductive container.

BACKGROUND OF THE INVENTION

The development of high energy cell systems requires the compatibility of an electrolyte possessing desirable electrochemical properties with highly active anode materials, such as lithium, calcium, sodium and the like, and the efficient use of high energy density cathode materials, such as $FeS_2$, $Co_3O_4$, $PbO_2$ and the like. The use of aqueous electrolytes is precluded in these systems since the anode materials are sufficiently active to react with water chemically. Therefore, in order to realize the high energy density obtainable through use of these highly reactive anodes and high energy density cathodes, it is necessary to use a non-aqueous electrolyte system.

One of the major disadvantages of employing lead dioxide ($PbO_2$) as the active cathode material in a non-aqueous electrolyte system is that it will discharge at two different potentials. The first step in the discharge curve is attributed to the reduction of the lead dioxide to lead monoxide, while the second step is attributed to the reduction of the reaction product, lead monoxide. Contrary to lead dioxide, lead monoxide will discharge in a non-aqueous cell system at a unipotential level. One advantage in employing lead dioxide as the cathode material over lead monoxide is that it has almost double the capacity of lead monoxide. Thus in a non-aqueous electrolyte system, lead monoxide will have the advantage of discharging at a unipotential plateau with the disadvantage of having a relatively low capacity while lead dioxide will have the advantage of having a relatively high capacity with the disadvantage of discharging at two distinct voltage plateaus.

Many cell or battery applications, particularly in transistorized devices such as hearing aids, watches and the like, require a substantial unipotential discharge source for proper operation and, therefore, cannot use the dual voltage level discharge which is characteristic of non-aqueous lead dioxide cells. This dual voltage level discharge characteristic is similar to the dual voltage discharge characteristic of aqueous alkaline divalent silver oxide cells. Although many approaches have been proposed for obtaining a unipotential discharge from an aqueous alkaline divalent silver oxide cell, the approaches are not needed when lead dioxide is employed in an aqueous electrolyte cell system. Specifically, in an aqueous electrolyte cell system, lead dioxide will discharge almost entirely at its higher voltage level so that, in effect, the cell will produce a substantially unipotential discharge over the useful life of the cell. Contrary to this, when lead dioxide is used as the cathode material in a non-aqueous electrolyte system, the cell will discharge at a first potential for a significant time period and then decrease to a distinct lower potential for the remainder of the discharge. A problem usually encountered in various cell systems is that although an electrode-couple can function in an aqueous electrolyte, it is practically impossible to predict in advance how well, if at all, it will function in a non-aqueous electrolyte. Thus a cell must be considered as a unit having three parts - a cathode, an anode and an electrolyte - and it is to be understood that the parts of one cell may not be predictably interchangeable with parts of another cell to produce an efficient and workable cell.

A French Pat. No. 2,288,401, published on June 18, 1976 (counterpart to German application 2,545,498 published on Apr. 27, 1976), discloses a non-aqueous cell which employs a negative electrode, such as lithium, a non-aqueous-solvent electrolyte and a positive active electrode consisting of a positive active material of the oxides and oxidizing salts the discharged reduction of which leads to metals of the group including lead, tin, gold, bismuth, zinc, cadmium and their alloys and an electronic conductor consisting at least on the surface of a material selected from the group including lead, tin, gold, bismuth, zinc, cadmium and their alloys. Several examples are disclosed in this reference in which lead monoxide is employed as the positive active material and lead, tin or graphite is employed as the electronic conductor. Although this reference teaches one means for obtaining a unipotential discharge for certain non-aqueous cell systems, as, for example, a cell employing lead monoxide as the positive active material, the subject invention is directed to the use of lead dioxide as a positive electrode in a non-aqueous system and wherein a layer of lead and/or lead monoxide is interposed between the positive lead dioxide electrode and the inner surface of a conductive container housing said electrode.

U.S. Pat. Nos. 3,615,858 and 3,655,450 disclose batteries composed of a principal active material and a secondary active material and constructed such that the discharge of the principal active material is through the secondary active material so as to achieve the discharge potential characteristics of the secondary active material. Although the electrolyte for use in the disclosed cells in these references is not specifically recited, the examples in the references all employ an aqueous electrolyte system. In U.S. Pat. No. 3,615,858, it states that divalent silver oxide can be discharged at the potential of lead dioxide. Contrary to this, the subject invention is directed to a cell which employs a lead dioxide positive electrode in a non-aqueous cell system and wherein a layer of lead and/or lead monoxide is interposed between the positive lead dioxide electrode and the inner surface of a conductive container housing said electrode so that the cell can be effectively discharged at a substantially unipotential level over the useful life of the cell.

Accordingly, it is the primary object of this invention to provide a non-aqueous lead oxide cell which employs a lead dioxide positive electrode which is separated or isolated from the inner surface of a conductive container housing said electrode by a layer of lead and/or lead monoxide and which has a substantially unipotential discharge voltage.

Another object of this invention is to provide a non-aqueous lead oxide cell which employs a lithium anode and a lead dioxide positive electrode, said positive electrode being separated from the inner surface of a conductive container housing said electrode by a layer of lead and/or lead monoxide, and which cell has a substantially unipotential discharge.

SUMMARY OF THE INVENTION

The invention relates to a non-aqueous lead dioxide cell having a negative electrode, a positive electrode comprising lead dioxide and an electrolyte housed within a conductive container; a layer of lead monoxide and/or lead interposed between, and electrically and physically in contact with, said positive electrode and the inner surface of the conductive container; and said cell having a substantially unipotential discharge voltage.

A unipotential discharge voltage shall mean a relatively constant voltage level extending over at least 85 per cent of a cell's discharge capacity when discharged across a fixed load, and wherein the voltage varies no more than ± 10 percent of the average voltage of said voltage level. For example, a unipotential discharge level can be represented by a voltage-time curve substantially free from voltage excursions or steps during at least 85 percent of the time of discharge across a constant load, such steps or excursions being defined as voltage readings outside of ± 10 percent of the average voltage over the said 85 percent portion of the time of discharge. As shown in FIG. 1, it is the object of this invention to effectively eliminate or effectively suppress the portion of the curve to the left of point A to yield a unipotential discharge level as generally shown by the curve between points A and B.

It is also within the scope of this invention to add a binder, an electronically conductive material, an electrolyte-absorbent material or mixtures thereof to the positive electrode of this invention.

The lead monoxide layer and/or lead layer for use in this invention between the lead dioxide electrode and the inner surface of the conductive container housing the electrode should be sufficient to substantially isolate or separate the positive electrode from the inner surface of the container such that the lead and/or lead monoxide layer will be the main electronic path through which the lead dioxide discharges.

Preferably, the lead and/or lead monoxide layer should be the sole electronic path through which discharge of the lead dioxide electrode occurs. The lead monoxide layer and/or lead layer should be sufficient in thickness to substantially eliminate the two voltage plateau discharge characteristic of lead dioxide in a non-aqueous electrolyte cell system. A lead monoxide layer is preferable to a lead layer because lead monoxide will contribute to the discharge capacity of the cell.

Useful highly active negative metal anode materials are generally consumable metals and include aluminum, the alkali metals, alkaline earth metals and alloys of alkali metals or alkaline earth metals with each other and other metals. The term "alloy" as used herein and in the appended claims is intended to include mixtures, solid solutions, such as lithium-magnesium, and intermetallic compounds, such as lithium monoaluminide. The preferred anode materials are lithium, sodium potassium, calcium and alloys thereof.

Useful organic solvents employed alone or mixed with one or more other solvents for use in this invention include the following classes of compounds:

Alkylene nitriles: e.g., crotonitrile (liquid range −51.1° to 120° C.)

Trialkyl borates: e.g., trimethyl borate, (CH$_3$O)$_3$B (liquid range −29.3° to 67° C.)

Tetraalkyl silicates: e.g., tetramethyl silicate, (CH$_3$O)$_4$Si (boiling point 121° C.)

Nitroalkanes: e.g., nitromethane, CH$_3$NO$_2$ (liquid range −17° to 100.8° C.)

Alkylnitriles: e.g., acetonitrile, CH$_3$CN (liquid range −45° to 81.6° C.)

Dialkylamides- e.g., dimethylformamide, HCON(CH$_3$)$_2$ (liquid range −60.48° to 149° C.)

Lactams: e.g., N-methylpyrrolidone,

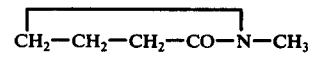

(liquid range −16° to 202° C.)

Tetraalkylureas: e.g., tetramethylurea, (CH$_3$)$_2$N—CO—N(CH$_3$)$_2$ (liquid range −1.2° to 166° C.)

Monocarboxylic acid esters: e.g., ethyl acetate (liquid range −83.6° to 77.06° C.)

Orthoesters: e.g., trimethylorthoformate, HC(OCH$_3$)$_3$ (boiling point 103° C.)

Lactones: e.g., γ-(gamma) butyrolactone,

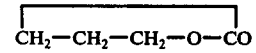

(liquid range −42° to 206° C.)

Dialkyl carbonates: e.g., dimethyl carbonate, OC(OCH$_3$)$_2$ (liquid range 2° to 90° C.)

Alkylene carbonates: e.g., propylene carbonate,

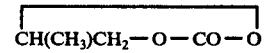

(liquid range −48° to 242° C.)

Monoethers: e.g., diethyl ether (liquid range −116° to 34.5° C.)

Polyethers: e.g., 1.1- and 1,2-dimethoxyethane (liquid ranges −113.2° to 64.5° C. and −58° to 83° C., respectively)

Cyclic ethers: e.g., tetrahydrofuran (liquid range −65° to 67° C.); 1,3-dioxolane (liquid range −95° to 78° C.)

Nitroaromatics: e.g., nitrobenzene (liquid range 5.7° to 210.8° C.)

Aromatic carboxlic acid halides: e.g., benzoyl chloride (liquid range 0° to 197° C.); benzoyl bromide (liquid range −24° to 218° C.)

Aromatic sulfonic acid halides: e.g., benzene sulfonyl chloride (liquid range 14.5° to 251° C.)

Aromatic phosphonic acid dihalides: e.g., benzene phosphonyl dichloride (boiling point 258° C.)

Aromatic thiophosphonic acid dihalides: e.g., benzene thiophosphonyl dichloride (boiling point 124° C. at 5 mm.)

Cyclic sulfones: e.g., sulfolane,

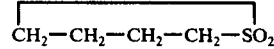

(melting point 22° C.); 3-methylsulfolane (melting point −1° C.)

Alkyl sulfonic acid halides: e.g., methanesulfonyl chloride (boiling point 161° C.)

Alkyl carboxylic acid halides: e.g., acetyl chloride (liquid range −112° to 50.9° C.); acetyl bromide (liquid range −96° to 76.° C.); propionyl chloride (liquid range −94° to 80° C.)

Saturated heterocyclics: e.g., tetrahydrothiophene (liquid range −96° to 121° C.); 3-methyl-2-oxazolidone (melting point 15.9° C.)

Dialkyl sulfamic acid halides: e.g., dimethyl sulfamyl chloride (boiling point 80° C. at 16 mm.)

Alkyl halosulfonates: e.g., ethyl chlorosulfonate (boiling point 151° C.)

Unsaturated heterocyclic carboxylic acid halides: e.g., 2-furoyl chloride (liquid range '2° to 173° C.)

Five-membered unsaturated heterocyclics: e.g., 3,5-dimethylisoxazole (boiling point 140° C.); 1-methylpyrrole (boiling point 114° C.); 2,4-dimethylthiazole (boiling point 144° C.); furan (liquid range −85.65° to 31.36° C.)

Esters and/or halides of dibasic carboxylic acids: e.g., ethyl oxalyl chloride (boiling point 135° C.)

Mixed alkyl sulfonic acid halides and carboxylic acid halides: e.g., chlorosulfonyl acetyl chloride (boiling point 98° C. at 10 mm.)

Dialkyl sulfoxides: e.g., dimethyl sulfoxide (liquid range 18.4° to 189° C.)

Dialkyl sulfates: e.g., dimethylsulfate (liquid range −31.75° to 188.5° C.)

Dialkyl sulfites: e.g., dimethylsulfite (boiling point 126° C.)

Alkylene sulfites: e.g., ethylene glycol sulfite (liquid range −11° to 173° C.)

Halogenated alkanes: e.g., methylene chloride (liquid range −95° to 40° C.); 1,3-dichloropropane (liquid range −99.5° to 120.4° C.)

Of the above, the preferred solvents are sulfolane; crotonitrile; nitrobenzene; tetrahydrofuran;; 1,3-dioxolane; 3-methyl-2-oxazolidone; propylene carbonate; γ-butyrolactone; ethylene glycol sulfite; dimethylsulfite; dimethyl sulfoxide; and 1,1- and 1,2-dimethoxyethane. Of the preferred solvents, the best are sulfolane; 3-methyl-2-oxazolidone; propylene carbonate and 1,3-dioxolane because they appear more chemically inert to battery components and have wide liquid ranges, and especially because they permit highly efficient utilization of the cathode materials.

The ionizing solute for use in the invention may be a simple or double salt or mixtures thereof, which will produce an ionically conductive solution when dissolved in one or more solvents. Preferred solutes are complexes of inorganic or organic Lewis acids and inorganic ionizable salts. The only requirements for utility are that the salts, whether simple or complex, be compatible with the solvent or solvents being employed and that they yield a solution which is sufficiently ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226 — July/December 1938, pages 293-313 by Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide It will be obvious to those skilled in the art that the double salts formed by a Lewis acid and an inorganic ionizable salt may be used as such or the individual components maybe added to the solvent separately to form the double salt or the resulting ions in situ. One such double salt, for example, is that formed by the combination of aluminum chloride and lithium chloride to yield lithium aluminum tetrachloride

EXAMPLE I

A flat-type cell was constructed utilizing a nickel metal base having therein a 1-inch diameter shallow depression into which the cell contents were placed and over which a nickel metal cap was placed to close the cell. The contents of the cell consisted of five sheets of lithium foil having a total thickness of 0.10 inch, about 4 ml of an electrolyte, two porous non-woven polypropylene separators (0.005 inch thick each) which absorbed some of the electrolyte, and a lead dioxide cathode mix.

Figure 1:
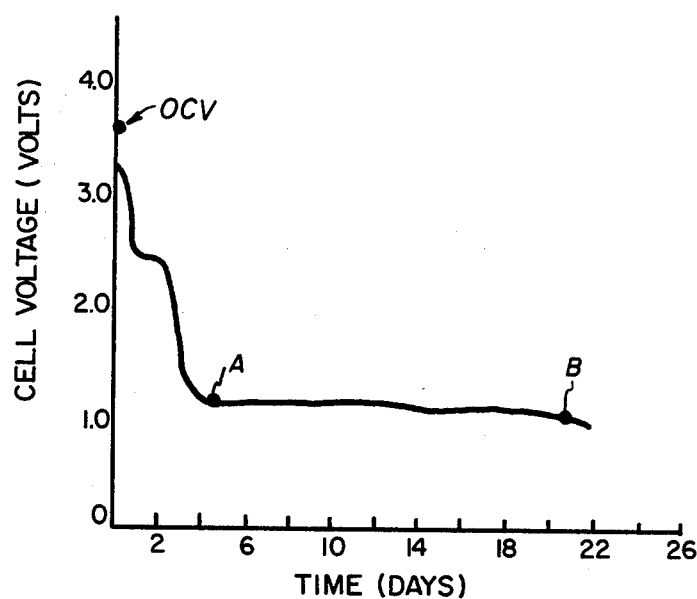
FIG. 1 is a curve showing the discharge characteristics of a non-aqueous lead oxide-lithium cell employing a lead dioxide positive electrode (cathode).

The electrolyte was a 1M $LiClO_4$ in 77 volume percent dioxolane, 23 volume percent dimethoxyethane (DME) with a trace of about 0.1 volume percent dimethyl isoxazole (DMI) as a polymerization inhibitor. The cathode was pressed layer of 4.3 grams of lead dioxide The cell was discharged across a constant load on a 3 milliampere drain and the voltage observed as a function of time is shown plotted as the curve on the graph in FIG. 1. Also observed and as recorded on FIG. 1 is the open circuit voltage of the cell which was 3.5 volts. As is apparent from the curve in FIG. 1, it took approximately 4 days before the voltage decreased to a substantially unipotential level of approximately 1.2 volts. However, many cell and battery powered devices which require an essentially unipotential power source could not use this type of cell system because of its significant dual voltage level discharge characteristic.

EXAMPLE II

A flat-type cell was constructed using the same components as described in Example I except that the cathode mix was a compressed layer of a mixture of 3 grams of lead monoxide and 0.5 gram of carbon black added for conductivity. As in Example I, the cathode mix was placed into the shallow depression in a nickel metal base along with the other cell components.

Figure 2:
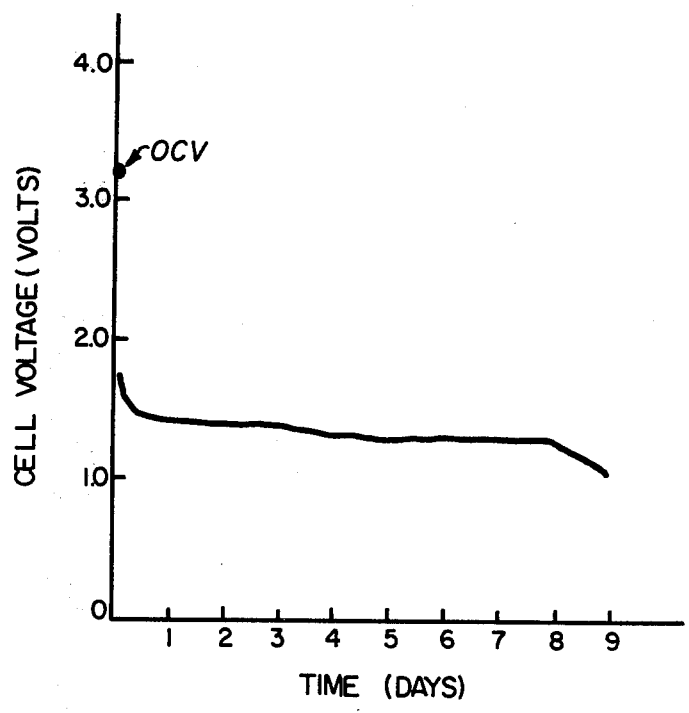
FIG. 2 is a curve showing the discharge characteristics of a non-aqueous lead oxide-lithium cell employing a lead monoxide positive electrode.

The cell was discharged on a 3-milliampere drain and the voltage observed as a function of time is shown plotted as the curve on the graph in FIG. 2. Also observed and as recorded on FIG. 2 is the open circuit voltage of the cell which was about 3.2 volts. This high open circuit voltage for the cell is believed to be due to the presence of oxygen and/or oxides on the surface of the carbon black in the cathode mix.

As is apparent from the curve in FIG. 2, the substantially unipotential voltage level output of this cell makes it an admirable candidate as a power source for many cell and battery operated devices. As stated above, however although this type of cell has the advantage of discharging at a substantially unipotential level, it has the disadvantage of having a rather low capacity as compared to a cell employing lead dioxide as the cathode material.

EXAMPLE III

A flat-type cell was constructed using the same components as described in Example I except that the cathode was prepared in the following manner:

1.67 grams of lead dioxide powder (about 90 percent by weight) were mixed with 5 percent polytetrafluoroethylene and 5 percent acetylene black and then molded into a cohesive disc form. A thin layer of lead powder, sized 0.0737 mm, was thereafter coated on both sides of the lead dioxide electrode and the coated electrode was then placed into the shallow depression in a nickel metal base as described in Example I.

Figure 3:
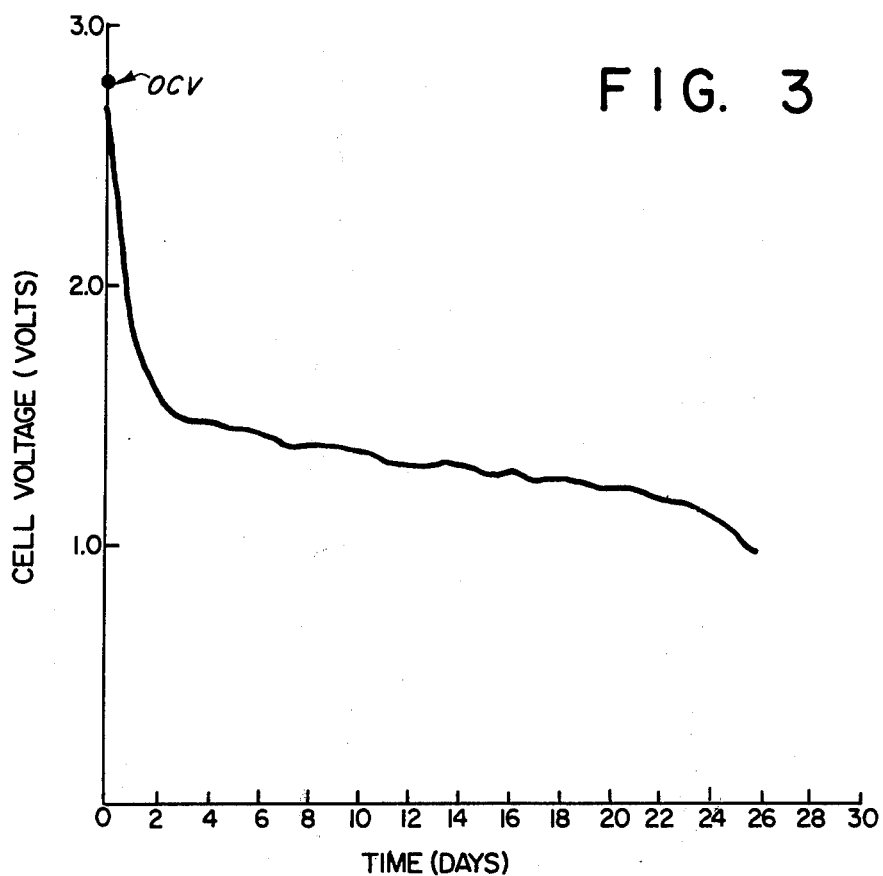
FIG. 3 is a curve showing the discharge characteristics of a non-aqueous lead oxide-lithium cell employing a lead dioxide positive electrode and having a layer of lead powder interposed substantially between the lead dioxide positive electrode and the inner surface of a conductive container housing said positive electrode in accordance with the present invention.

The cell made in accordance with the invention was discharged across a 1K-ohm load (about 1.3 milliampere drain) andd the voltage observed as a function of time is shown plotted as the curve on the graph in FIG. 3. Also observed and as recorded in FIG. 3 is the open circuit voltage of the cell which was about 2.8 volts.

As is apparent from the curve in FIG. 3, the output voltage of this cell continued at the substantially unipotential level of lead monoxide-lithium for the major portion of its useful life. Thus using the teachings of this invention, a non-aqueous lead dioxide cell can be made which takes advantage of the high capacity characteristic of lead dioxide while simultaneously substantially eliminating the disadvantage of the dual voltage level output characteristic of lead dioxide in a non-aqueous cell system.

EXAMPLE IV

A flat-type cell was constructed using the same components as desribed in Example I except that the cathode was prepared in the following manner:

1.5 grams of lead dioxide powder (about 85 percent by weight) were mixed with 10 per cent polytetrafluoroethylene and 5 percent carbon black and then molded into a cohesive disc form. Before placing the electrode into a nickel metal base as described in Example I, a thin layer of lead monoxide, 1.9 grams in weight, was placed between the inner surface of the shallow depression in the nickel metal base cathode collector and the lead dioxide electrode The cell so produced in accordance with this invention was then discharged across a 300-ohm load (about 4.3 milliampere drain) and the voltage observed as a function of time is shown plotted as the curve on the graph in FIG. 4. Also observed and as recorded in FIG. 4 is the open circuit voltage of the cell which was about 1.65 volts.

Figure 4:
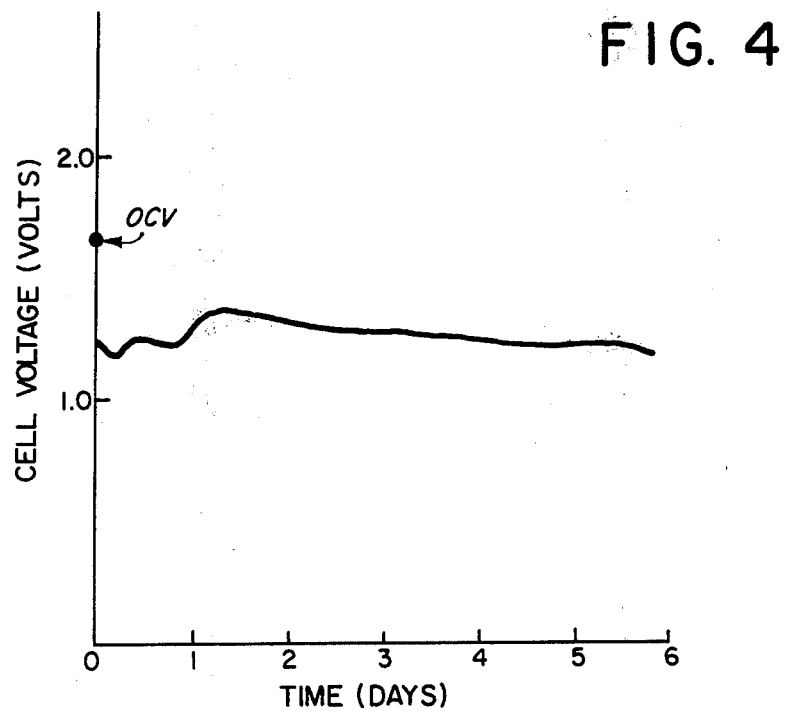
FIG. 4 is a curve showing the discharge characteristics of a non-aqueous lead oxide-lithium cell employing a lead dioxide positive electrode and having a layer of lead monoxide interposed substantially between the lead dioxide positive electrode and the inner surface of a conductive container housing said electrode in accordance with the present invention.

As is apparent from the curve in FIG. 4, the cell discharged at a substantially unipotential level almost immediately and then continued to discharge at the lead monoxide-lithium voltage level for more and 6 days. Thus using the teachings of this invention, a non-aqueous lead dioxide cell can be made which takes advantage of the high capacity characteristic of lead dioxide while simultaneously effectively eliminating the disadvantage of the dual voltage level output characteristic of lead dioxide in a non-aqueous cell system.

EXAMPLE V

A flat-type cell was constructed using the same components as described in Example I except that the positive electrode consisted of two electrodes. The first electrode, made of 2.8 grams of lead dioxide (about 92 percent by weight) mixed with 3 percent polytetrafluoroethylene and 5 per cent partially oxidized lead powder, was compressed onto an expanded nickel mesh. The second electrode, made of 3.5 grams of lead monoxide (about 92.5 per cent by weight) mixed with 7.5 percent polytetrafluoroethylene, was compressed onto a polypropylene mesh. The lead monoxide electrode was placed into the shallow depression of a nickel base followed by the lead dioxide electrode so that the lead monoxide layered electrode was interposed between the lead dioxide electrode and the inner surface of the depression in the nickel base The cell so produced in accordance with this invention was then discharged across a 300-ohm load (about 3.7 milliampere drain) and the voltage observed as a function of time is shown plotted as the curve on the graph in FIG. 5. Also observed and as recorded on FIG. 5 is the open circuit voltage of the cell which was about 2.8 volts.

Figure 5:
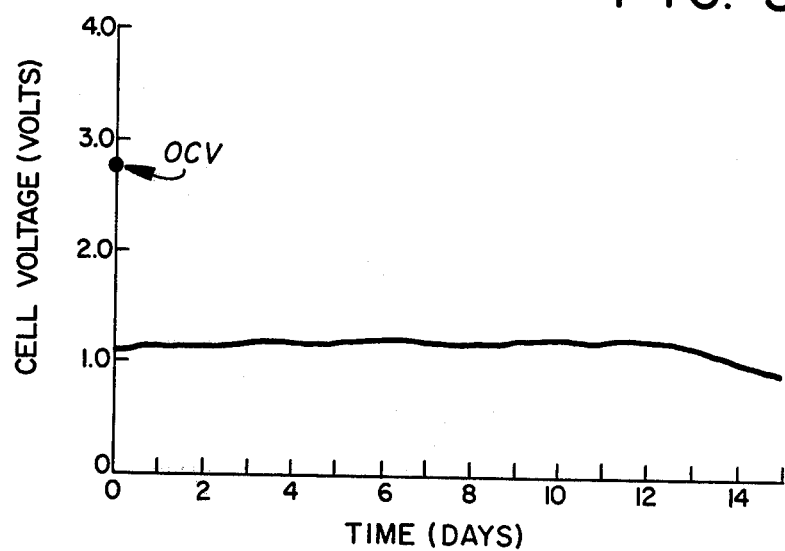
FIG. 5 is a curve showing the discharge characteristics of a non-aqueous lead oxide-lithium cell employing a lead dioxide positive electrode and having a layer of lead particles interposed substantially between the lead dioxide positive electrode and the inner surface of a conductive container housing said electrode in accordance with the present invention.

As is apparent from the curve in FIG. 5, the cell discharged at a substantially unipotential level immediately and then continued at the lead monoxide-lithium voltage level for more than 14 days. Thus using the teachings of this invention, a non-aqueous lead dioxide cell can be made which takes advantage of the high capacity characteristic of lead dioxide while simultaneously effectively eliminating the disadvantage of the dual voltage level output characteristic of lead dioxide in a non-aqueous cell system.

EXAMPLE VI

A flat-type cell was constructed as described in Example I, using the same type lithium anode foil and separators. The electrolyte for the cell was 1M LiCF$_3$SO$_3$ in 50 vol. % dioxolane — 50 vl. % dimethoxyethane. The positive electrode was prepared as follows:

1.5 grams of a mixture of 92.5 percent lead monoxide and 7.5 percent polytetrafluoroethylene were molded onto an expanded nickel mesh. Next, 1.5 grams of a mixture of 92 percent lead dioxide 3 per cent polytetrafluoroethylene and 5 percent partially oxidized lead powder were molded on top of the lead monoxide layer, followed by a third layer of 1.5 grams of the same lead dioxide mixture compressed on top of the previous layer. The layered positive electrode was then inserted into the shallow depression in a nickel base with the lead monoxide layer disposed adjacent the inner surface of the shallow depression.

Figure 6:
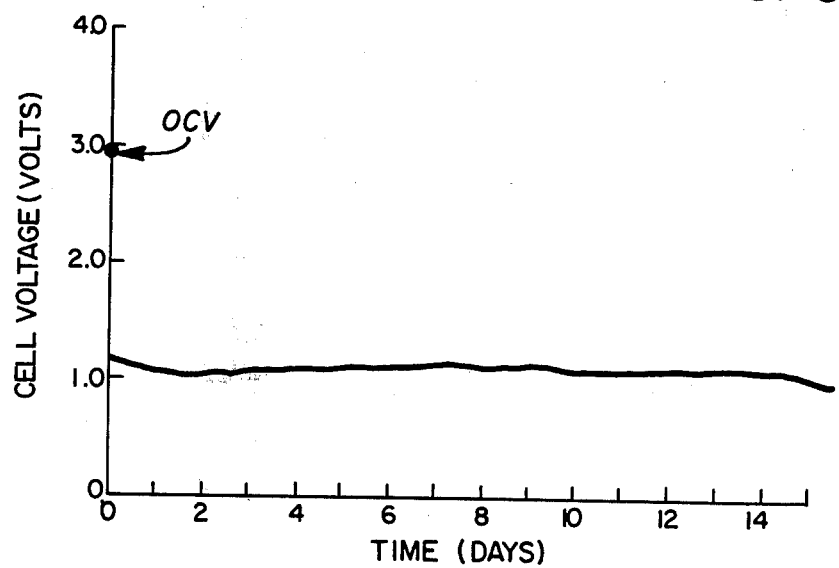
FIG. 6 is a curve showing the discharge characteristics of a non-aqueous lead oxide-lithium cell employing a lead dioxide positive electrode and having a layer of lead monoxide interposed substantially between the lead dioxide positive electrode and the inner surface of a conductive container housing said positive electrode in accordance with the present invention.

The cell was discharged on a 4-milliampere drain and the voltage observed as a function of time is shown plotted as the curve on the graph in FIG. 6. Also observed and as recorded on FIG. 6 is the open circuit voltage of the cell which was about 3 volts.

As is apparent from the curve in FIG. 6, the cell discharged at a substantially unipotential level throughout. Thus using the teachings of this invention, a non-aqueous lead dioxide cell can be made which takes advantage of the high capacity characteristic of lead dioxide, while simultaneously effectively eliminating the disadvantage of the dual voltage level output characteristic of lead dioxide in a non-aqueous cell system.

EXAMPLE VII

Several flat-type cells were constructed as described in Example VI using the same cell components except the electrolyte was as shown in the Table. The current density, the apparent cathode efficiency, and energy density for each cell were calculated. The data so obtained are also shown in the Table.

TABLE

| SALTS | SOLVENT (S) (% BY VOLUME) | APPARENT CATHODE EFF.*(%) | ENERGY DENSITY (Wh/in$^3$)** | CURRENT DENSITY (mA/cm$^2$) |
|---|---|---|---|---|
| 2 M LiBF$_4$ | 40 Diox-30 DME-30 3Me20x | 71 | 23.0 | 0.8 |
| 2 M LiAsF$_6$ | 40 Diox-30 DME-30 3Me20x | 68 | 22.0 | 0.8 |
| 2 M LiClO$_4$ | Diox | 90 | 30.1 | 0.8 |
| 2 M LiCF$_3$SO$_3$ | 40 Diox-30 DME-30 3Me20x | 78 | 27.1 | 0.8 |
| 1 M LiClO$_4$ | 77 Diox-23 DME | 103 | 41.5 | 0.2 |

Notes:
Diox = dioxolane; DME = dimethoxyethane; 3Me20x = 3-methyl-2-oxazolidone
*Calculated based on 2 electrons for PbO and 4e for PbO$_2$ content.
**Calculated based on actual cathode volume.

As is apparent from the data shown in the Table, efficient non-aqueous lead dioxide cell can be made using the teachings of the subject invention.

It is to be understood that other modifications and changes to the preferred embodiments of the invention herein shown and described can also be made without departing from the spirit and scope of the invention.

What is claimed is:

1. A non-aqueous lead oxide cell comprising a highly active metal negative electrode, a positive electrode comprising lead dioxide and an non-aqueous electrolyte comprising a salt dissolver in an organic solvent housed within a conductive container; a layer of lead monoxide interposed between, and electrically and physically in contact with, said positive electrode and the inner surface of the conductive container; and said cell having a substantially unipotential discharge voltage.

2. The lead oxide cell of claim 1 wherein the lead monoxide layer is the sole electronic path between the lead dioxide positive electrode and the inner surface of the conductive container.

3. The lead oxide cell of claim 1 wherein the active metal negative electrode is selected from the group consisting of aluminum, the alkali metals, the alkaline earth metals and alloys thereof.

4. The lead oxide cell of claim 1 wherein the solute of the electrolyte is a complex salt of a Lewis acid and an inorganic ionizable salt.

5. The lead oxide cell of claim 1 wherein the solvent of the electrolyte is at least one solvent selected from the group consisting of sulfolane; crotonitrile; nitrobenzene; tetrahydrofuran; 1,3-dioxolane; 3-methyl-2-oxazolidone; propylene carbonate; γ-butyrolactone; ethylene glycol sulfite; dimethylsulfite; dimethyl sulfoxide; 1,1- and 1,2-dimethoxyethane; and dimethyl isoxazole.

6. The lead oxide cell of claim 3 wherein the active metal negative electrode is selected from the group consisting of lithium, sodium, potassium, calcium and alloys thereof.

7. The lead oxide cell of claim 6 wherein the active metal negative electrode is lithium.

8. The lead oxide cell of claim 5 wherein said at least one solvent is selected from the group consisting of sulfolane; 3-methyl-2-oxazolidone; propylene carbonate; 1,3-dioxolane; and dimethoxyethane.

9. A non-aqueous lead oxide cell comprising a highly active metal negative electrode, a positive electrode comprising lead dioxide; and an non-aqueous electrolyte comprising a salt dissolved in an organic solvent housed within a conductive container; a layer of lead interposed between, and electrically and physically in contact with, said positive electrode and the inner surface of the conductive container; and said cell having a substantially unipotential discharge voltage.

10. The lead oxide cell of claim 9 wherein the lead layer is the sole electronic path between the lead dioxide positive electrode and the inner surface of the conductive housing.

11. The lead oxide cell of claim 9 wherein the active metal negative electrode is selected from the group consisting of aluminum, the alkali metals, the alkaline earth metals and alloys thereof.

12. The lead oxide cell of claim 9 wherein the solute of the electrolyte is a complex salt of a Lewis acid and an inorganic ionizable salt.

13. The lead oxide cell of claim 9 wherein the solvent of the electrolyte is at least one solvent selected from the group consisting of sulfolane; crotonitrile; nitrobenzene; tetrahydrofuran; 1,3-dioxolane; 3-methyl-2-oxazolidone; propylene carbonate; γ-butyrolactone; ethylene glycol sulfite; dimethylsulfite; dimethyl sulfoxide; 1,1- and 1,2-dimethoxyethane; and dimethyl isoxazole.

14. The lead oxide cell of claim 11 wherein the active metal negative electrode is selected from the group consisting of lithium, sodium, potassium, calcium and alloys thereof.

15. The lead oxide cell of claim 14 wherein the active metal negative electrode is lithium.

16. The lead oxide cell of claim 13 wherein said at least one solvent is selected from the group consisting of sulfolane; 3-methyl-2-oxazolidone; propylene carbonate; 1,3-dioxolane; and dimethoxyethane.

17. A non-aqueous lead oxide cell comprising a highly active metal negative electrode, a positive electrode comprising lead dioxide and an non-aqueous electrolyte comprising a salt dissolved in an organic solvent housed within a conductive container; a layer of lead and lead monoxide interposed between, and electrically and physically in contact with, said positive electrode and the inner surface of the conductive container; and said cell having a substantially unipotential discharge voltage.

18. The lead oxide cell of claim 17 wherein the lead and lead monoxide layer is the sole electronic path between the lead dioxide positive electrode and the inner surface of the conductive container,.

19. The lead oxide cell of claim 17 wherein the active metal negative electrode is selected from the group consisting of aluminum, the alkali metals, the alkaline earth metals and alloys thereof.

20. The lead oxide cell of claim 17 wherein the solute of the electrolyte is a complex salt of a Lewis acid and an inorganic ionizable salt.

21. The lead oxide cell of claim 17 wherein the solvent of the electrolyte is at least one solvent selected from the group consisting of sulfolane; crotonitrile; nitrobenzene; tetrahydrofuran; 1,3-dioxolane; 3-methyl-2-oxazolidone; propylene carbonate; γ-bytyrolactone; ethylene glycol sulfite; dimethylsulfite; dimethyl sulfoxide; 1,1- and 1,2-dimethoxyethane; and dimethyl isoxazole.

22. The lead oxide cell of claim 19 wherein the active metal negative electrode is selected from the group consisting of lithium, sodium, potassium, calcium and alloys thereof.

23. The lead oxide cell of claim 19 wherein the active metal negative electrode is lithium.

24. The lead oxide cell of claim 21 wherein said at least one solvent is selected from the group consisting of sulfolane; 3-methyl-2-oxazolidone; propylene carbonate; 1,3-dioxolane; and dimethoxyethane.

* * * * *